US009391703B2

(12) United States Patent  (10) Patent No.: US 9,391,703 B2
Kakande  (45) Date of Patent: Jul. 12, 2016

(54) TRANSMISSION OF A DATA STREAM USING ENHANCEMENT LAYERS OF MULTIPLE HIERARCHICALLY MODULATED OPTICAL WAVES

(71) Applicant: Alcatel-Lucent USA Inc., Murray Hill, NJ (US)

(72) Inventor: Joseph K. Kakande, Jersey City, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 156 days.

(21) Appl. No.: 14/456,262

(22) Filed: Aug. 11, 2014

(65) Prior Publication Data

US 2016/0043805 A1   Feb. 11, 2016

(51) Int. Cl.
*H04J 14/00* (2006.01)
*H04B 10/2575* (2013.01)
*H04J 14/02* (2006.01)
*H04J 14/06* (2006.01)

(52) U.S. Cl.
CPC ............ *H04B 10/2575* (2013.01); *H04J 14/02* (2013.01); *H04J 14/06* (2013.01)

(58) Field of Classification Search
CPC .. H04B 10/505; H04B 10/506; H04B 10/516; H04B 10/548; H04B 10/60; H04B 10/611; H04B 10/612; H04B 10/613; H04B 10/61; H04J 14/02; H04J 14/06
USPC ............... 398/77, 78, 79, 183, 192, 193, 194, 398/202, 208, 135, 136, 43, 158, 159, 140, 398/141; 375/260, 261, 262, 265, 341, 332, 375/298; 341/143
See application file for complete search history.

(56) References Cited

U.S. PATENT DOCUMENTS 7,599,446 B2    10/2009  Moon et al.
7,620,324 B2 *  11/2009  Minato ................. H04J 14/005
                                                 398/77

(Continued)

OTHER PUBLICATIONS

Cao, Pan et al., "Power Margin Improvement for OFDMA-PON Using Hierarchical Modulation," Optics Express, 2013, vol. 21, No. 7, pp. 8261-8268.

(Continued)

*Primary Examiner* — Hanh Phan
(74) *Attorney, Agent, or Firm* — Mendelsohn Dunleavy, P.C.; Yuri Gruzdkov

(57) ABSTRACT

We disclose an optical transport system configured to transport an additional data stream using hierarchical modulation. In an example embodiment, copies of the additional data stream are encoded onto enhancement layers of multiple hierarchically modulated optical waves transported through the system in a multiplexed manner. An optical receiver coupled to a remote end of the optical transport link is configured to use this redundant transmission of the additional data stream to improve the bit-error rate thereof, e.g., by first extracting the signal components corresponding to the enhancement layers of the different hierarchically modulated optical waves and then combining the extracted signal components in a manner that tends to reduce, through averaging, the relative magnitude of noise in the combined signal compared to that in the individual extracted signal components. The disclosed signal-transmission format is suitable for various types of multiplexing, e.g., any combination of space-, wavelength-, and polarization-division multiplexing.

20 Claims, 6 Drawing Sheets

(56) References Cited

U.S. PATENT DOCUMENTS

| | | | |
|---|---|---|---|
| 7,680,415 B2 * | 3/2010 | Minato | H04J 14/005 398/155 |
| 8,149,752 B2 | 4/2012 | Li et al. | |
| 8,243,601 B2 | 8/2012 | Li et al. | |
| 2010/0142644 A1 | 6/2010 | Jiang et al. | |
| 2013/0070785 A1 | 3/2013 | Liu et al. | |
| 2013/0272451 A1 | 10/2013 | Lim et al. | |

OTHER PUBLICATIONS

Korotky, Steven K., et al., "Expectations of Optical Network Traffic Gain Afforded by Bit Rate Adaptive Transmission," Alcatel-Lucent, Bell LabsTechnical Journal 2010, 14(4), pp. 285-295.

Sallam, Sara, "16-QAM Hierarchical Modulation Optimization in Relay Cooperative Networks," Thesis, Department of Electrical and Computer Engineering Presented in Partial Fulfillment of the Requirements for the Degree of Master of Applied Sciences at Concordia University Montreal, Quebec, Canada, 2013 (175 pages).

* cited by examiner

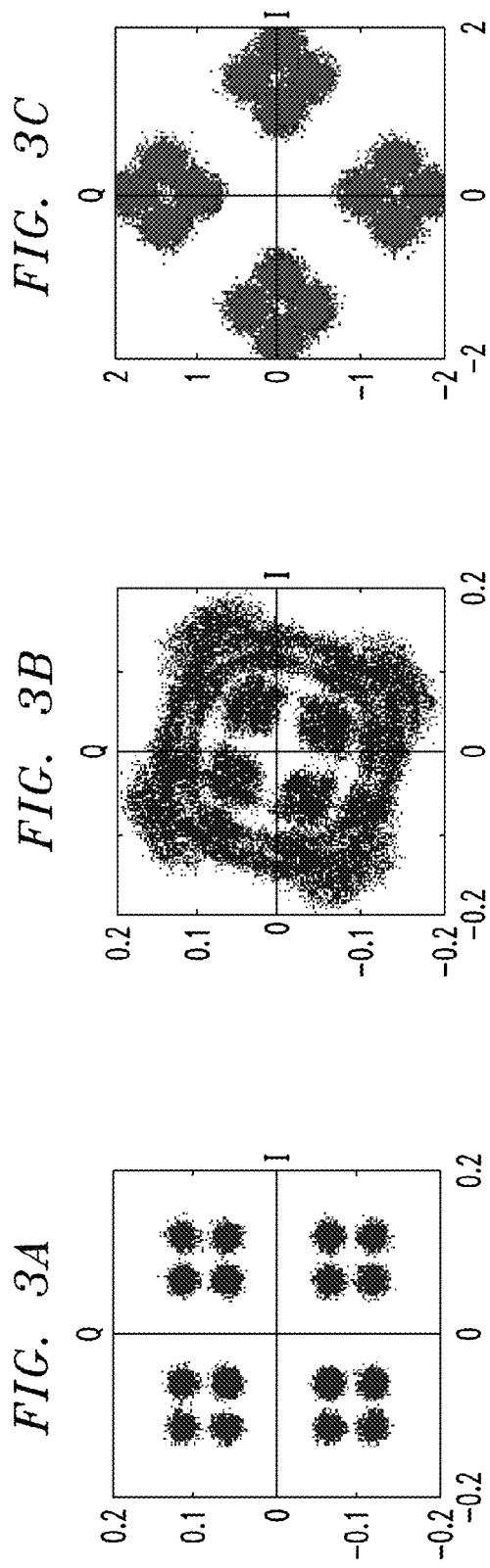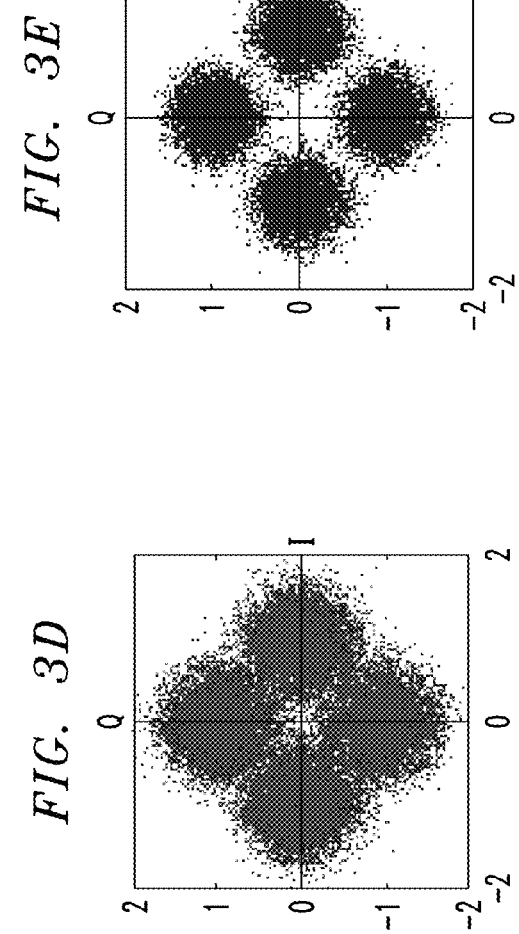

500

600

TRANSMISSION OF A DATA STREAM USING ENHANCEMENT LAYERS OF MULTIPLE HIERARCHICALLY MODULATED OPTICAL WAVES

BACKGROUND

1. Field

The present disclosure relates to optical communication equipment and, more specifically but not exclusively, to the use of hierarchical modulation in optical transport systems.

2. Description of the Related Art

This section introduces aspects that may help facilitate a better understanding of the disclosure. Accordingly, the statements of this section are to be read in this light and are not to be understood as admissions about what is in the prior art or what is not in the prior art.

As used herein, the term "hierarchical modulation" refers to a modulation technique in which multiple data streams are multiplexed into a single symbol stream. In its most basic form, hierarchical modulation has two modulation layers referred to as the base layer and the enhancement layer. In this particular hierarchical-modulation variant, each constellation point of the base layer is split into multiple constellation points using the operative constellation of the enhancement layer. In more-complex hierarchical-modulation schemes, more enhancement layers can be added by further splitting each of the constellation points corresponding to the last enhancement layer using the operative constellation of the next enhancement layer. In the literature, hierarchical modulation may also be referred to as "layered modulation."

SUMMARY OF SOME SPECIFIC EMBODIMENTS

Disclosed herein are various embodiments of an optical transport system configured to transport an additional data stream using hierarchical modulation. In an example embodiment, copies of the additional data stream are encoded onto enhancement layers of two or more different hierarchically modulated optical waves transported through the system in a multiplexed manner. An optical receiver coupled to a remote end of the optical transport link is configured to use this redundant transmission of the additional data stream to improve the bit-error rate thereof, e.g., by first extracting the signal components corresponding to the enhancement layers of the different hierarchically modulated optical waves and then combining the extracted signal components in a manner that tends to reduce, through averaging, the relative magnitude of noise in the combined signal compared to that in the individual extracted signal components. The disclosed signal-transmission format is suitable for various types of multiplexing, e.g., any combination of space-division multiplexing, wavelength-division multiplexing, and polarization-division multiplexing.

According to one embodiment, provided is an apparatus comprising: an optical de-multiplexer configured to de-multiplex an optical input signal into a plurality of hierarchically modulated optical waves; a plurality of base-layer decoders, each configured to recover a respective base data stream encoded in a base layer of a respective one of the plurality of the hierarchically modulated optical waves; a superposition module configured to generate a superposed electrical signal by superposing a plurality of electrical signals, each representing an enhancement layer of the respective one of the plurality of the hierarchically modulated optical waves; and an enhancement-layer decoder configured to decode the superposed electrical signal to recover an additional data stream, a respective copy of which is encoded in an enhancement layer of each of the plurality of the hierarchically modulated optical waves.

According to another embodiment, provided is an apparatus comprising: a plurality of encoders, each configured to generate a respective electrical drive signal based on a respective one of a plurality of base data streams and a respective copy of an additional data stream; a plurality of optical modulators, each configured to be driven by the respective electrical drive signal in a manner that causes each of the optical modulators to generate a respective one of a plurality of hierarchically modulated optical waves, wherein a base layer of the respective one of the hierarchically modulated optical waves carries the respective one of the plurality of base data streams, and an enhancement layer of each of the hierarchically modulated optical waves carries the additional data stream; and an optical multiplexer configured to multiplex the plurality of the hierarchically modulated optical waves to generate an optical output signal.

According to yet another embodiment, provided is a communication method comprising the steps of: (A) de-multiplexing an optical input signal into a plurality of hierarchically modulated optical waves; (B) recovering a respective base data stream encoded in a base layer of a respective one of the plurality of the hierarchically modulated optical waves; (C) generating a superposed electrical signal by superposing a plurality of electrical signals, each representing an enhancement layer of the respective one of the plurality of the hierarchically modulated optical waves; and (D) decoding the superposed electrical signal to recover an additional data stream, a respective copy of which is encoded in an enhancement layer of each of the plurality of the hierarchically modulated optical waves.

BRIEF DESCRIPTION OF THE DRAWINGS

Other aspects, features, and benefits of various disclosed embodiments will become more fully apparent, by way of example, from the following detailed description and the accompanying drawings, in which:

FIGS. 3A-3E graphically illustrate the signal processing in the optical receiver of FIG. 2 according to an embodiment of the disclosure;

DETAILED DESCRIPTION

Various hierarchical-modulation schemes that may be used in some embodiments are disclosed, e.g., in U.S. Pat. Nos. 7,599,446, 8,149,752, and 8,243,601 and U.S. Patent Application Publication Nos. 2013/0272451 and 2010/0142644, all of which are incorporated herein by reference in their entirety. Some embodiments may benefit from the methods and apparatus for optical hierarchical modulation disclosed, e.g., in an article by Pan Cao, Xiaofeng Hu, Zhiming Zhuang, et al., entitled "Power Margin Improvement for OFDMA-PON Using Hierarchical Modulation," published in OPTICS EXPRESS, 2013, Vol. 21, No. 7, pp. 8261-8268, which is incorporated herein by reference in its entirety.

Figure 1:
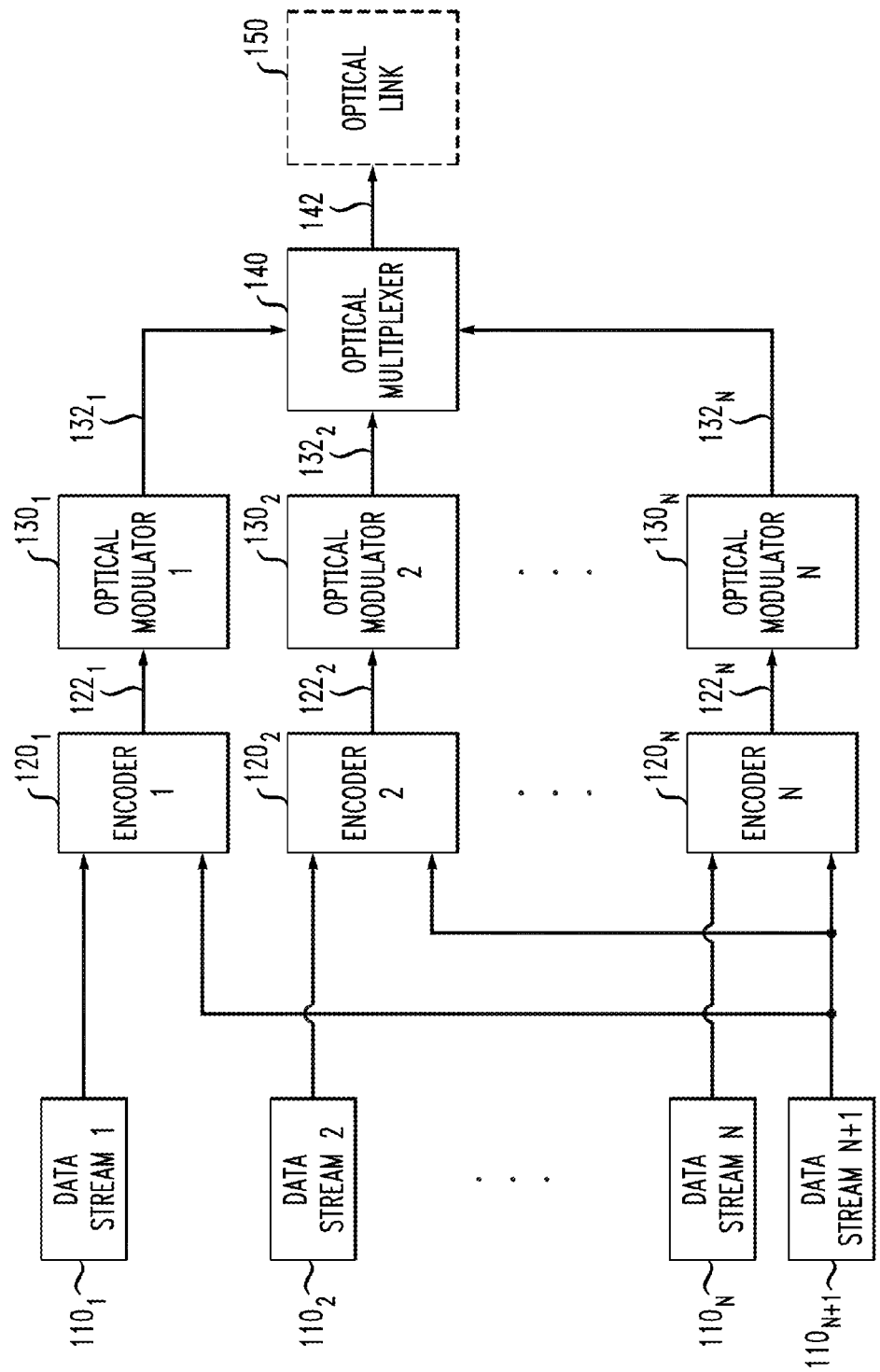
FIG. 1 shows a block diagram of an optical transmitter according to an embodiment of the disclosure.

FIG. 1 shows a block diagram of an optical transmitter 100 according to an embodiment of the disclosure. Transmitter 100 is configured to generate a multiplexed hierarchically modulated optical signal 142 for transmission to a remote optical receiver over an optical transport link 150. Optical signal 142 is generated to carry N+1 different (e.g., uncorrelated) data streams $110_1$-$110_{N+1}$ using N different optical channels, where N is a positive integer greater than one.

In an example embodiment, optical transport link 150 is configured to support multiple degrees of freedom, such as spatial localization, carrier frequency (wavelength), and polarization. Each of these degrees of freedom can be used for generating optical signal 142 through optical-signal multiplexing in an optical multiplexer 140. Multiplexing techniques corresponding to these different individual degrees of freedom are referred to in the literature as space-division multiplexing, wavelength-division multiplexing (including orthogonal frequency-division multiplexing), and polarization-division multiplexing. As used herein, the term "optical channel" refers to a component of optical signal 142 configured to use a unique set of the degrees of freedom of link 150 for carrying encoded data. In a representative embodiment, two optical channels are two components of optical signal 142 that carry at least partially different sets of data and differ from one another in at least one of their degrees of freedom, e.g., in one or more of spatial localization, polarization of light, and carrier (or subcarrier) wavelength.

For example, a first optical channel in link 150 may be configured to use carrier wavelength $\lambda_1$, and a second optical channel may be configured to use carrier wavelength $\lambda_2$. As another example, a first optical channel in link 150 may be configured to use a first propagation path of a multipath fiber or fiber-optic cable (e.g., via a first core of a multi-core fiber or a first guided mode of a multimode fiber), and a second optical channel may be configured to use a second propagation path of that multipath fiber or fiber-optic cable (e.g., via a second core of the multi-core fiber or a second guided mode of the multimode fiber). As yet another example, a first optical channel in link 150 may be configured to use a first (e.g., X) polarization, and a second optical channel may be configured to use a second (e.g., Y) polarization. Note that, in each of these examples, the first and second optical channels are described as differing from one another in the parameters of just one degree of freedom. However, different optical channels may differ from one another in the parameters of two or more degrees of freedom, such as: (i) spatial localization and wavelength; (ii) spatial localization and polarization; (iii) wavelength and polarization; or (iv) spatial localization, wavelength, and polarization.

Each of the (populated) optical channels in optical link 150 is configured to carry the data received by transmitter 100 via a subset of data streams $110_1$-$110_{N+1}$ using a respective hierarchically modulated optical wave. The hierarchical modulation is enabled in transmitter 100 by hierarchical encoders $120_1$-$120_N$ and optical modulators $130_1$-$130_N$. Each hierarchical encoder $120_i$ (where i=1, 2, . . . , N) is configured to generate a drive signal $122_i$ for optical modulator $130_i$ based on data stream $110_i$ and a respective copy of data stream $110_{N+1}$ in a manner that causes the optical modulator to generate a hierarchically modulated optical wave $132_i$, wherein data stream $110_i$ is encoded in the base layer thereof, and data stream $110_{N+1}$ is encoded in the enhancement layer thereof. As a result, the base layers of optical waves $132_1$-$132_N$ carry different respective data streams, while the enhancement layers of optical waves $132_1$-$132_N$ all carry the same data stream (i.e., data stream $110_{N+1}$). Optical multiplexer 140 operates to appropriately multiplex optical waves $132_1$-$132_N$, thereby generating optical signal 142 and causing it to populate a selected subset of the optical channels of link 150. In an example embodiment, optical multiplexer 140 may operate to cause each of optical waves $132_1$-$132_N$ to populate a respective one optical channel of link 150.

Figure 2:
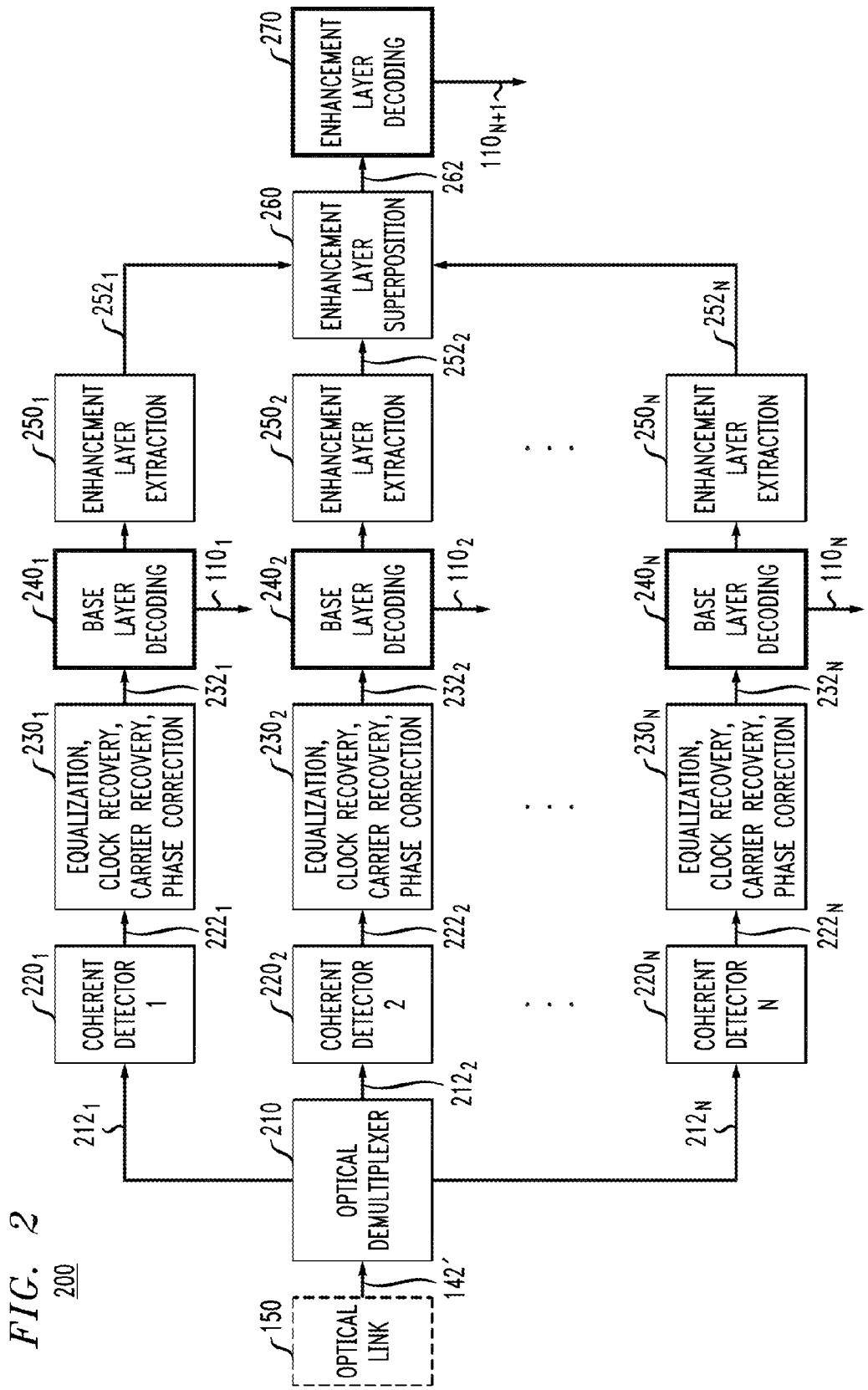
FIG. 2 shows a block diagram of an optical receiver according to an embodiment of the disclosure.

FIG. 2 shows a block diagram of an optical receiver 200 according to an embodiment of the disclosure. Receiver 200 is shown in FIG. 2 as being coupled to optical transport link 150 (also see FIG. 1). When transmitter 100 applies optical signal 142 to the remote end of link 150, the optical link causes receiver 200 to receive an optical signal 142' that differs somewhat from optical signal 142, but otherwise carries the same data. The differences between optical signals 142 and 142' may be, e.g., in the amount of noise, signal distortions, and signal impairments, some of which are imposed by link 150. The train of signal processing implemented in receiver 200 is directed at recovering data streams $110_1$-$110_{N+1}$ from optical signal 142'.

Receiver 200 has an optical de-multiplexer 210 that operates to separate the different optical components of optical signal 142' corresponding to different populated channels of link 150, thereby generating hierarchically modulated optical waves $212_1$-$212_N$. Coherent detectors $220_1$-$220_N$ perform homodyne or intradyne detection of optical waves $212_1$-$212_N$, as known in the art, thereby converting each of the optical waves into a respective one of electrical digital signals $222_1$-$222_N$. Digital signals $222_1$-$222_N$ are then processed in the digital-signal-processor (DSP) portion of receiver 200 to recover data streams $110_1$-$110_{N+1}$.

The DSP portion of receiver 200 comprises signal-processing modules $230_1$-$230_N$, base-layer decoders $240_1$-$240_N$, enhancement-layer extractors $250_1$-$250_N$, an enhancement-layer superposition module 260, and an enhancement-layer decoder 270.

Signal-processing modules $230_1$-$230_N$ are configured to appropriately condition digital signals $222_1$-$222_N$ for decoding in base-layer decoders $240_1$-$240_N$, respectively. For example, signal-processing modules $230_1$-$230_N$ may perform, inter alia, signal equalization, clock recovery, carrier recovery, and phase-error correction, as known in the art. The resulting conditioned signals are digital signals $232_1$-$232_N$.

In an example embodiment, each of base-layer decoders $240_1$-$240_N$ is configured to decode the respective one of digital signals $232_1$-$232_N$ by (i) mapping it, in each symbol period, onto the operative base-layer constellation, while treating the enhancement-layer component of the signal as noise, and (ii) recovering the respective one of data streams $110_1$-$110_N$ based on the mapping.

Each of enhancement-layer extractors $250_1$-$250_N$ operates to extract the enhancement-layer component of the respective one of digital signals $232_1$-$232_N$ based on the decoding results of base-layer decoders $240_1$-$240_N$. For example, in one embodiment, enhancement-layer extractor $250_i$ (where i=1, 2, . . . , N) may be configured to generate a digital signal $252_i$ that represents the enhancement-layer component of digital signal $232_i$ by (i) estimating, in each symbol period, the base-layer component of digital signal $232_i$, e.g., using the base-layer constellation point onto which digital signal $232_i$ was mapped in base-layer decoder $240_i$, and (ii) subtracting the estimated base-layer component from digital signal $232_i$. Despite the fact that, in each symbol period, each of digital signals $252_1$-$252_N$ encodes the same constellation point defined by the corresponding segment of data stream $110_{N+1}$, digital signals $252_1$-$252_N$ typically differ from one another, e.g., due to the different respective amounts of noise imposed during transmission onto optical signal 142 in different optical channels of link 150.

Enhancement-layer superposition module 260 is configured to superpose digital signals $252_1$-$252_N$, e.g., by coherently summing them, thereby generating a superposed digital signal 262. The superposition serves to sum the enhancement-layer components received via different optical channels of link 150 in a manner that reduces the relative magnitude of noise/distortions in signal 262 compared to that in individual ones of signals $252_1$-$252_N$. The reduction occurs because the noise/distortions in individual signals $252_1$-$252_N$ are generally uncorrelated and, as such, tend to average out upon summation.

Enhancement-layer decoder 270 is configured to decode superposed digital signal 262 by (i) mapping it, in each symbol period, onto the operative enhancement-layer constellation and (ii) recovering data stream $110_{N+1}$ based on the mapping.

In some embodiments, receiver 200 may be configured to implement additional signal processing on digital signals $252_1$-$252_N$ prior to applying these signals to enhancement-layer superposition module 260. Such additional signal processing may include but is not limited to phase and frequency offset compensation.

FIGS. 3A-3E graphically illustrate the signal processing in receiver 200 (FIG. 2) according to an embodiment of the disclosure. More specifically, each of FIGS. 3A-3E shows a scatter plot on the I/Q plane representing a respective modulated signal. The hierarchical constellation used in this embodiment is a 4/16-QAM hierarchical constellation. One of ordinary skill in the art will understand that, in alternative embodiments, other suitable hierarchical constellations may similarly be used.

In a 4/16-QAM hierarchical constellation, two 4-QAM constellations are superposed such that each constellation point of the first (base-layer) 4-QAM constellation is split into four constellation points corresponding to the second (enhancement-layer) 4-QAM constellation, for a total of sixteen constellation points. The bits encoded by the first 4-QAM constellation are referred to as the "base bits," and they are common for all constellation points of the 4/16-QAM hierarchical constellation located in the same quadrant of the IQ plane. The bits corresponding to the second 4-QAM constellation are referred to as the "enhancement bits." The enhancement bits may be more vulnerable to noise than the base bits because the separating distance between the constellation points of the second 4-QAM constellation is smaller than the separating distance between the (virtual unsplit) constellation points of the first 4-QAM constellation.

FIG. 3A shows an example scatter plot corresponding to one of optical waves $132_1$-$132_N$ (see FIG. 1) before it is coupled into link 150 for transmission to receiver 200 (FIG. 2). For illustration purposes and without undue limitation, let us assume that this scatter plot represents optical wave $132_1$. One of ordinary skill in the art will appreciate that scatter plots representing the other ones of optical waves $132_1$-$132_N$ may be similar to the scatter plot shown in FIG. 3A.

FIG. 3B shows an example scatter plot representing electrical digital signal $222_1$, which corresponds to optical wave $132_1$ at receiver 200 (FIG. 2). Comparison of FIGS. 3A and 3B reveals the effects of noise and signal distortions imposed by link 150 and the front end of receiver 200. One of ordinary skill in the art will appreciate that scatter plots representing the other ones of digital signals $222_1$-$222_N$ may be similar to the scatter plot shown in FIG. 3B.

FIG. 3C shows an example scatter plot representing electrical digital signal $232_1$, which is generated by processing electrical digital signal $222_1$ in signal-processing module $230_1$ (FIG. 2). Comparison of FIGS. 3B and 3C reveals the benefits of, e.g., signal equalization and phase-error correction carried out in signal-processing module $230_1$. The four clusters of received symbols corresponding to the four constellation points of the first (base-layer) 4-QAM constellation of the 4/16-QAM hierarchical constellation are now well-separated from one another for reliable base-layer decoding in decoder $240_1$. The splitting of the base-layer constellation points caused by the presence of the enhancement layer is also evident in FIG. 3C.

FIG. 3D shows an example scatter plot representing electrical digital signal $252_1$, which is generated by enhancement-layer extractor $250_1$ based on electrical digital signal $232_1$ and the estimated base-layer component thereof determined in decoder $240_1$ (see FIG. 2). If the signal illustrated in FIG. 3D were to be decoded directly by an enhancement-layer decoder similar to decoder 270 (FIG. 2), then the resulting bit-error rate (BER) would have been about $2.1 \times 10^{-2}$. One of ordinary skill in the art will appreciate that scatter plots representing the other ones of digital signals $252_1$-$252_N$ may be similar to the scatter plot shown in FIG. 3D.

FIG. 3E shows an example scatter plot representing superposed digital signal 262, which is generated by enhancement-layer superposition module 260 by superposing digital signals $252_1$-$252_N$. Visual comparison of FIGS. 3D and 3E reveals the improved separation between the four clusters of received symbols corresponding to the four constellation points of the second (enhancement-layer) 4-QAM constellation of the 4/16-QAM hierarchical constellation. When the signal illustrated in FIG. 3E is decoded by enhancement-layer decoder 270 (FIG. 2), the resulting BER is about $1.4 \times 10^{-3}$, which is a significant improvement compared to the BER corresponding to the signal shown in FIG. 3D.

Figure 4:
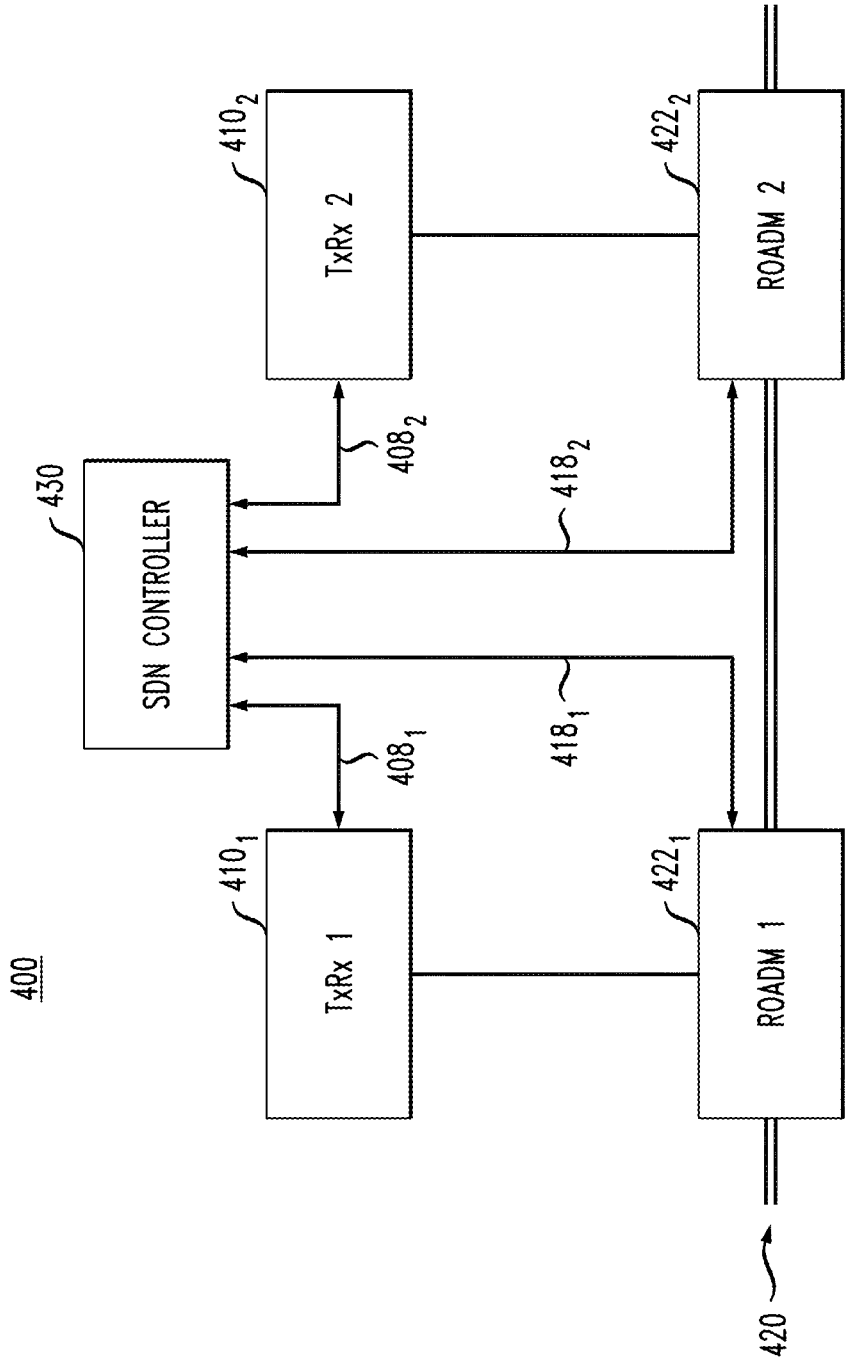
FIG. 4 shows a block diagram of an optical transport system in which the optical transmitter of FIG. 1 and/or the optical receiver of FIG. 2 may be used according to an embodiment of the disclosure.

FIG. 4 shows a block diagram of an optical transport system 400 in which optical transmitter 100 (FIG. 1) and/or optical receiver 200 (FIG. 2) may be used according to an embodiment of the disclosure. System 400 is illustratively shown as having two optical transceivers (TxRx), labeled $410_1$ and $410_2$, respectively. One of ordinary skill in the art will understand that, in an alternative embodiment, system 400 may have a different number of optical transceivers 410.

In an example embodiment, each optical transceiver 410 includes a respective instance (physical copy) of optical transmitter 100 and a respective instance of optical receiver 200, which enables bidirectional data transport in system 400. For example, optical transceiver $410_1$ may be configured to transmit data to and receive data from optical transceiver $410_2$. Similarly, optical transceiver $410_2$ may be configured to transmit data to and receive data from optical transceiver $410_1$. Optical transceivers $410_1$ and $410_2$ may also be configured to transmit data to and receive data from other optical transceivers 410 (if any) in system 400. Example embodiments of optical transceiver 410 are described in more detail below in reference to FIGS. 5 and 6.

System 400 includes an optical path 420 that connects optical transceivers $410_1$ and $410_2$ as indicated in FIG. 4. Optical path 420 comprises reconfigurable optical add-drop multiplexers (ROADMs) $422_1$ and $422_2$ that may be optically connected to one another by one or more stretches of optical fiber or fiber-optic cable.

The configurations of optical transceivers $410_1$ and $410_2$ and ROADMs $422_1$ and $422_2$ are controlled by a controller 430, e.g., via control paths $408_1$, $408_2$, $418_1$, and $418_2$. For example, each of control paths $408_1$ and $408_2$ may be used to: (i) supply data streams, such as data streams $110_1$-$110_{N+1}$ (see FIG. 1), from the data plane of the system to the corresponding transceiver 410 for transmission over optical path 420 and (ii) retrieve the received data streams, such as data streams $110_1$-$110_{N+1}$ (see FIG. 2), from the corresponding transceiver 410 for distribution over the data plane to respective recipients. Each of control paths $418_1$ and $418_2$ may be used to appropriately configure the corresponding one of ROADMs $422_1$ and $422_2$ to add/drop optical signals to/from optical path 420. In one embodiment, controller 430 can be a software-defined networking (SDN) controller.

Figure 5:
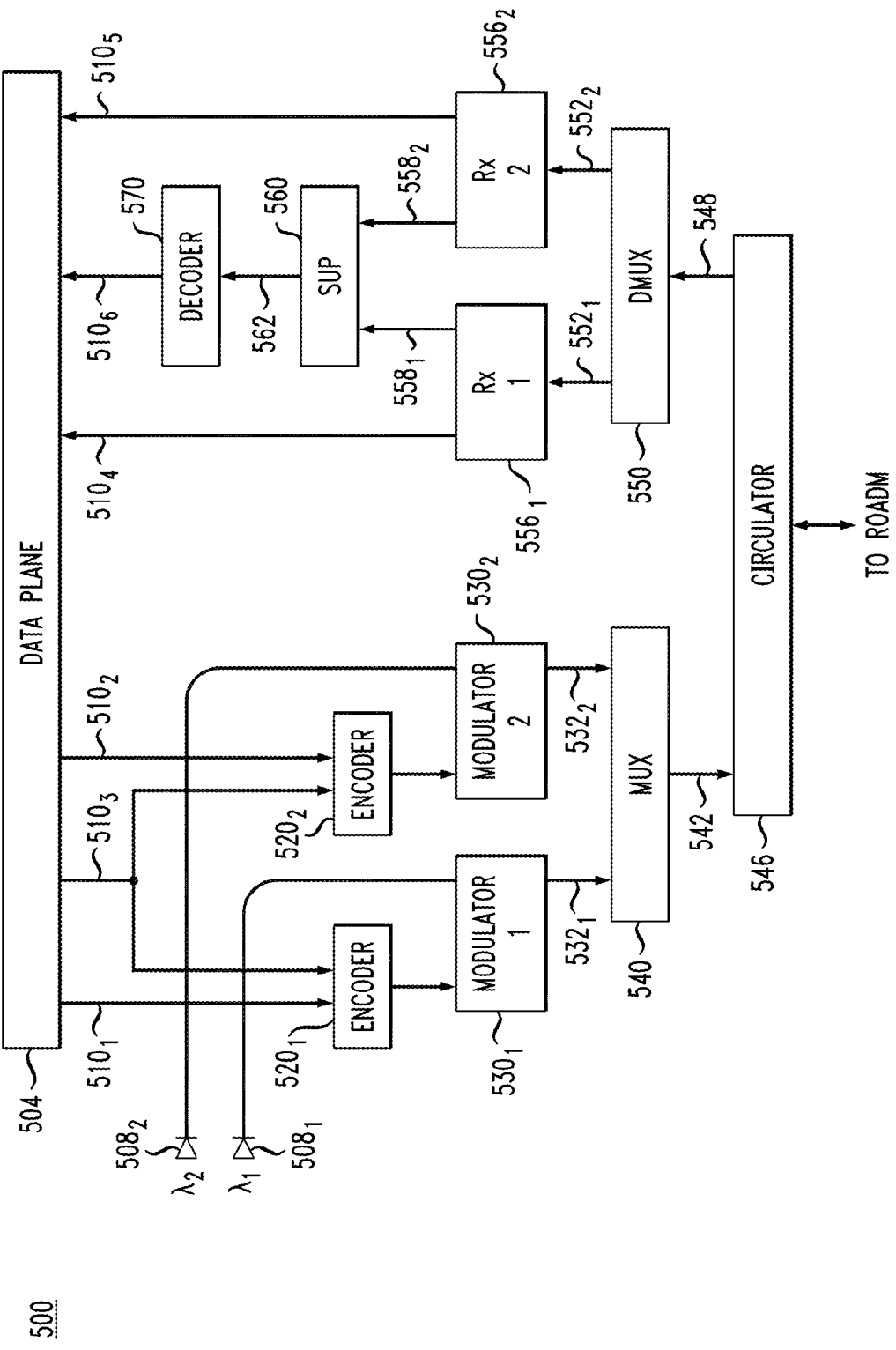
FIG. 5 shows a block diagram of an optical transceiver that can be used in the optical transport system of FIG. 4 according to an embodiment of the disclosure.

FIG. 5 shows a block diagram of an optical transceiver 500 that can be used as transceiver 410 (FIG. 4) according to an embodiment of the disclosure. Transceiver 500 is configured to use wavelength-division multiplexing (WDM) to transmit and receive hierarchically modulated optical signals. For illustration purposes and without loss of generality, the operation of transceiver 500 is described below in reference to two carrier wavelengths, labeled $\lambda_1$ and $\lambda_2$. From the provided description, one of ordinary skill in the art will understand how to modify transceiver 500 for three or more carrier wavelengths.

The transmitter portion of transceiver 500 includes light sources $508_1$ and $508_2$ configured to generate carrier waves at wavelengths $\lambda_1$ and $\lambda_2$, respectively. These carrier waves are modulated with data in optical modulators $530_1$ and $530_2$ to generate hierarchically modulated optical waves $532_1$ and $532_2$. Drive signals for optical modulators $530_1$ and $530_2$ are generated by encoders $520_1$ and $520_2$, respectively, based on data streams $510_1$-$510_3$ received from a data plane 504. More specifically, encoder $520_1$ operates to cause hierarchically modulated optical wave $532_1$ to carry data stream $510_1$ in the base layer thereof, and data stream $510_3$ in the enhancement layer thereof. Encoder $520_2$ similarly operates to cause hierarchically modulated optical wave $532_2$ to carry data stream $510_2$ in the base layer thereof, and data stream $510_3$ in the enhancement layer thereof. Hierarchically modulated optical waves $532_1$ and $532_2$ are multiplexed in an optical multiplexer (MUX) 540 to generate a hierarchically modulated WDM signal 542, which is then directed by a circulator 546 to a corresponding ROADM, such as ROADM 422 (FIG. 4).

Encoders $520_1$ and $520_2$ are embodiments of encoders 120 (FIG. 1). Optical modulators $530_1$ and $530_2$ are embodiments of optical modulators 130 (FIG. 1). Optical multiplexer 540 is an embodiment of optical multiplexer 140 (FIG. 1).

The receiver portion of transceiver 500 includes optical receivers (Rx's) $556_1$ and $556_2$ configured to receive hierarchically modulated optical waves $552_1$ and $552_2$, respectively. Optical waves $552_1$ and $552_2$ are generated by an optical de-multiplexer (DMUX) 550 by demultiplexing a hierarchically modulated WDM signal 548 received from a remote transmitter via the corresponding ROADM and circulator 546. Hierarchically modulated WDM signal 548 may be generally analogous to hierarchically modulated WDM signal 542 and generated by the remote transmitter in a similar manner. In an example embodiment, optical waves $552_1$ and $552_2$ have carrier wavelengths $\lambda_1$ and $\lambda_2$, respectively.

Optical receivers $556_1$ and $556_2$ operate to recover the data streams encoded in the base layers of optical waves $552_1$ and $552_2$, respectively. These data streams, labeled $510_4$ and $510_5$, are applied directly to data plane 504. Optical receivers $556_1$ and $556_2$ further operate to extract enhancement-layer components $558_1$ and $558_2$ of optical waves $552_1$ and $552_2$, respectively, for coherent summation in a an enhancement-layer superposition module (SUP) 560. A resulting superposed digital signal 562 is then decoded in an enhancement-layer decoder 570 to recover the data stream encoded in the enhancement layers of optical waves $552_1$ and $552_2$. The recovered data stream, labeled $510_6$, is then applied by decoder 570 to data plane 504.

In an example embodiment, each of optical receivers $556_1$ and $556_2$ may comprise a respective copy of coherent detector 220 (FIG. 2), a respective copy of signal-processing module 230 (FIG. 2), a respective copy of base-layer decoder 240 (FIG. 2), and a respective copy of enhancement-layer extractor 250 (FIG. 2). Enhancement-layer superposition module 560 is an embodiment of enhancement-layer superposition module 260 (FIG. 2). Enhancement-layer decoder 570 is an embodiment of enhancement-layer decoder 270 (FIG. 2).

Figure 6:
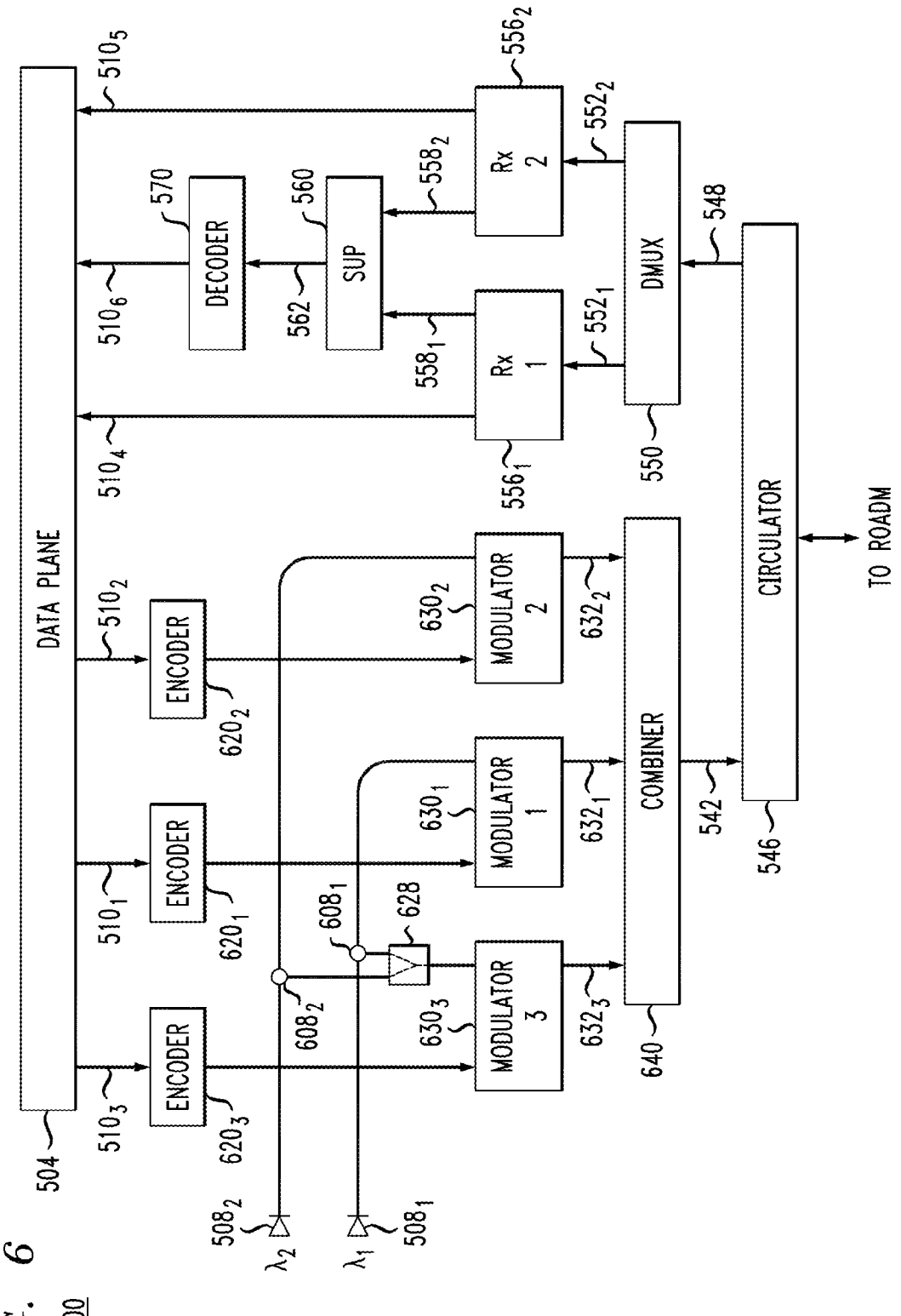
FIG. 6 shows a block diagram of an optical transceiver that can be used in the optical transport system of FIG. 4 according to another embodiment of the disclosure.

FIG. 6 shows a block diagram of an optical transceiver 600 that can be used as transceiver 410 (FIG. 4) according to an embodiment of the disclosure. Transceiver 600 is functionally analogous to transceiver 500 (FIG. 5) and employs many of the same circuit elements. The description of these elements is not repeated here. Instead, the following description of transceiver 600 primarily focuses on the differences between the two transceivers.

The transmitter portion of transceiver 600 differs from the transmitter portion of transceiver 500 in that hierarchically modulated WDM signal 542 is generated by combining three conventionally modulated (single-layer) optical signals $632_1$-$632_3$ in an optical combiner 640. More specifically, optical signal $632_1$ is generated in a conventional manner by an optical modulator $630_1$, which receives carrier wavelength $\lambda_1$ from light source $508_1$ and is driven by a drive signal generated by an encoder $620_1$ based on data stream $510_1$. Optical signal $632_2$ is similarly generated by an optical modulator $630_2$, which receives carrier wavelength $\lambda_2$ from light source $508_2$ and is driven by a drive signal generated by an encoder $620_2$ based on data stream $510_2$. Optical signal $632_3$ has both carrier wavelengths $\lambda_1$ and $\lambda_2$ and is generated by an optical modulator $630_3$, which is driven by a drive signal generated by an encoder $620_3$ based on data stream $510_3$.

Carrier wavelengths $\lambda_1$ and $\lambda_2$ are applied to optical modulator $630_3$ by an optical combiner 628 that is coupled to the outputs of light sources $508_1$ and $508_2$ via optical splitters $608_1$ and $608_2$ as indicated in FIG. 6. The splitting ratio of each of optical splitters $608_1$ and $608_2$ is selected such as to provide an appropriate power ratio between the base and enhancement layers in the corresponding WDM ($\lambda_1$ and $\lambda_2$) components of hierarchically modulated WDM signal 542, wherein: (i) optical signal $632_1$ provides the base layer for the $\lambda_1$ component of WDM signal 542; (ii) optical signal $632_2$ provides the base layer for the $\lambda_2$ component of WDM signal 542; and (iii) optical signal $632_3$ provides the enhancement layers for both of the $\lambda_1$ and $\lambda_2$ components of WDM signal 542.

The receiver portion of transceiver 600 is substantially the same as the receiver portion of transceiver 500 (FIG. 5).

According to an example embodiment disclosed above in reference to FIGS. 1-6, provided is an apparatus (e.g., 200, FIG. 2; 400, FIG. 4; 500, FIG. 5; 600, FIG. 6) comprising: an optical de-multiplexer (e.g., 210, FIG. 2) configured to de-multiplex an optical input signal (e.g., 142', FIG. 2) into a plurality of hierarchically modulated optical waves (e.g., $212_1$-$212_N$, FIG. 2); a plurality of base-layer decoders (e.g., $240_1$-$240_N$, FIG. 2), each configured to recover a respective base data stream (e.g., $110_1$-$110_N$, FIGS. 1-2) encoded in a base layer of a respective one of the plurality of the hierarchically modulated optical waves; a superposition module (e.g., 260, FIG. 2) configured to generate a superposed electrical signal (e.g., 262, FIG. 2) by superposing a plurality of electrical signals (e.g., $252_1$-$252_N$, FIG. 2), each representing an enhancement layer of the respective one of the plurality of the hierarchically modulated optical waves; and an enhancement-layer decoder (e.g., 270, FIG. 2) configured to decode the superposed electrical signal to recover an additional data stream (e.g., $110_{N+1}$, FIGS. 1-2), a respective copy of which is encoded in an enhancement layer of each of the plurality of the hierarchically modulated optical waves.

In some embodiments of the above apparatus, a base layer of a first hierarchically modulated optical wave (e.g., $212_1$, FIG. 2) of the plurality of the hierarchically modulated optical waves is configured to carry a first data stream (e.g., $110_1$, FIGS. 1-2); a base layer of a second hierarchically modulated optical wave (e.g., $212_2$, FIG. 2) of the plurality of the hierarchically modulated optical waves is configured to carry a second data stream (e.g., $110_2$, FIGS. 1-2) different from the first data stream; an enhancement layer of the first hierarchically modulated optical wave is configured to carry the additional data stream different from each of the first and second data streams; and an enhancement layer of the second hierarchically modulated optical wave is configured to carry the additional data stream. The plurality of base-layer decoders comprises: a first decoder (e.g., $240_1$, FIG. 2) configured to recover the first data stream by decoding a first electrical signal (e.g., $232_1$, FIG. 2) generated using the first hierarchically modulated optical wave; and a second decoder configured to recover the second data stream by decoding a second electrical signal (e.g., $232_2$, FIG. 2) generated using the second hierarchically modulated optical wave. The plurality of electrical signals comprises (i) a first electrical signal (e.g., $252_1$, FIG. 2) representing the enhancement layer of the first hierarchically modulated optical wave and (ii) a second electrical signal (e.g., $252_2$, FIG. 2) representing the enhancement layer of the second hierarchically modulated optical wave.

In some embodiments of any of the above apparatus, a base layer of a third hierarchically modulated optical wave (e.g., $212_N$, FIG. 2) of the plurality of the hierarchically modulated optical waves is configured to carry a third data stream (e.g., $110_N$, FIGS. 1-2) different from each of the first, second, and additional data streams; an enhancement layer of the third hierarchically modulated optical wave is configured to carry the additional data stream; the plurality of base-layer decoders comprises a third decoder (e.g., $240_N$, FIG. 2) configured to recover the third data stream by decoding a third electrical signal (e.g., $232_N$, FIG. 2) generated using the third hierarchically modulated optical wave; and the plurality of electrical signals comprises a third electrical signal (e.g., $252_N$, FIG. 2) representing the enhancement layer of the third hierarchically modulated optical wave.

In some embodiments of any of the above apparatus, the superposition module is configured to generate the superposed electrical signal by summing the plurality of electrical signals in a manner that causes the superposed electrical signal to have a lower level of noise compared to a level of noise in any one of the plurality of the electrical signals taken individually (e.g., as indicated in FIGS. 3D and 3E).

In some embodiments of any of the above apparatus, the optical de-multiplexer is configured to perform one or more of space-division demultiplexing, wavelength-division demultiplexing, and polarization-division demultiplexing to generate the plurality of the hierarchically modulated optical waves.

In some embodiments of any of the above apparatus, the apparatus further comprises a plurality of enhancement-layer extractors (e.g., $250_1$-$250_N$, FIG. 2), each coupled between a respective one of the plurality of the base-layer decoders and the superposition module and configured to generate a respective one of the plurality of the electrical signals by (i) estimating, in each symbol period, a base-layer component of the respective one of the plurality of the hierarchically modulated optical waves and (ii) subtracting, in each symbol period, the estimated base-layer component from an electrical signal generated by optically detecting (e.g., using one of $220_1$-$220_N$, FIG. 2) the respective one of the plurality of the hierarchically modulated optical waves.

In some embodiments of any of the above apparatus, each of the plurality of the hierarchically modulated optical waves has a same (e.g., common, nominally identical) symbol rate.

In some embodiments of any of the above apparatus, each of the base data streams has a first (e.g., common, nominally identical) bit rate.

In some embodiments of any of the above apparatus, the additional data stream has a second bit rate different from the first bit rate.

In some embodiments of any of the above apparatus, the additional data stream has the first bit rate.

In some embodiments of any of the above apparatus, the apparatus further comprises an optical transmitter (e.g., 100, FIG. 1) configured to cause the optical de-multiplexer to receive the optical input signal.

In some embodiments of any of the above apparatus, the optical transmitter comprises: a plurality of encoders (e.g., $120_1$-$120_N$, FIG. 1), each configured to generate a respective electrical drive signal (e.g., $122_1$-$122_N$, FIG. 1) based on a respective one of the plurality of the base data streams (e.g., $110_1$-$110_N$, FIG. 1) and a respective copy of the additional data stream; a plurality of optical modulators (e.g., $130_1$-$130_N$, FIG. 1), each configured to be driven by the respective electrical drive signal in a manner that causes each of the optical modulators to generate the respective one of the plurality of the hierarchically modulated optical waves, wherein the base layer of the respective one of the hierarchically modulated optical waves carries the respective one of the plurality of the base data streams, and the enhancement layer of each of the hierarchically modulated optical waves carries the additional data stream; and an optical multiplexer (e.g., 140, FIG. 1) configured to multiplex the plurality of the hierarchically modulated optical waves in a manner that causes the optical de-multiplexer to receive the optical input signal.

In some embodiments of any of the above apparatus, the optical multiplexer is configured to perform one or more of space-division multiplexing, wavelength-division multiplexing, and polarization-division multiplexing to multiplex the plurality of the hierarchically modulated optical waves.

In some embodiments of any of the above apparatus, the apparatus further comprises an optical link (e.g., 150, FIGS. 1-2) configured to optically couple the optical transmitter and the optical de-multiplexer.

In some embodiments of any of the above apparatus, the optical link comprises at least one reconfigurable optical add-drop multiplexer (e.g., 422, FIG. 4) located between the optical transmitter and the optical de-multiplexer.

According to another example embodiment disclosed above in reference to FIGS. 1-6, provided is an apparatus (e.g., 100, FIG. 1; 400, FIG. 4; 500, FIG. 5; 600, FIG. 6) comprising: a plurality of encoders (e.g., $120_1$-$120_N$, FIG. 1), each configured to generate a respective electrical drive signal (e.g., $122_1$-$122_N$, FIG. 1) based on a respective one of a plurality of base data streams (e.g., $110_1$-$110_N$, FIG. 1) and a respective copy of an additional data stream (e.g., $110_{N+1}$, FIG. 1); a plurality of optical modulators (e.g., $130_1$-$130_N$, FIG. 1), each configured to be driven by the respective electrical drive signal in a manner that causes each of the optical modulators to generate a respective one of a plurality of hierarchically modulated optical waves (e.g., $132_1$-$132_N$, FIG. 1), wherein a base layer of the respective one of the hierarchically modulated optical waves carries the respective one of the plurality of base data streams, and an enhancement layer of each of the hierarchically modulated optical waves carries the additional data stream; and an optical multiplexer (e.g., 140, FIG. 1) configured to multiplex the plurality of the hierarchically modulated optical waves to generate an optical output signal (e.g., 142, FIG. 1).

In some embodiments of the above apparatus, the optical multiplexer is configured to perform one or more of space-division multiplexing, wavelength-division multiplexing, and polarization-division multiplexing to generate the optical output signal.

In some embodiments of any of the above apparatus, a base layer of a first hierarchically modulated optical wave (e.g., $132_1$, FIG. 1) of the plurality of the hierarchically modulated optical waves is configured to carry a first data stream (e.g., $110_1$, FIG. 1); a base layer of a second hierarchically modulated optical wave (e.g., $132_2$, FIG. 1) of the plurality of the hierarchically modulated optical waves is configured to carry a second data stream (e.g., $110_2$, FIG. 1) different from the first data stream; an enhancement layer of the first hierarchically modulated optical wave is configured to carry the additional data stream different from each of the first and second data streams; and an enhancement layer of the second hierarchically modulated optical wave is configured to carry the additional data stream.

In some embodiments of any of the above apparatus, a base layer of a third hierarchically modulated optical wave (e.g., $132_N$, FIG. 1) of the plurality of the hierarchically modulated optical waves is configured to carry a third data stream (e.g., $110_N$, FIG. 1) different from each of the first, second, and additional data streams; and an enhancement layer of the third hierarchically modulated optical wave is configured to carry the additional data stream.

According to yet another example embodiment disclosed above in reference to FIGS. 1-6, provided is a communication method comprising the steps of: de-multiplexing an optical input signal (e.g., 142', FIG. 2) into a plurality of hierarchically modulated optical waves (e.g., $212_1$-$212_N$, FIG. 2); recovering a respective base data stream (e.g., $110_1$-$110_N$, FIGS. 1-2) encoded in a base layer of a respective one of the plurality of the hierarchically modulated optical waves; generating a superposed electrical signal (e.g., 262, FIG. 2) by superposing a plurality of electrical signals (e.g., $252_1$-$252_N$, FIG. 2), each representing an enhancement layer of the respective one of the plurality of the hierarchically modulated optical waves; and decoding the superposed electrical signal to recover an additional data stream (e.g., $110_{N+1}$, FIGS. 1-2), a respective copy of which is encoded in an enhancement layer of each of the plurality of the hierarchically modulated optical waves.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
an optical de-multiplexer configured to de-multiplex an optical input signal into a plurality of hierarchically modulated optical waves;
a plurality of base-layer decoders, each configured to recover a respective base data stream encoded in a base layer of a respective one of the plurality of the hierarchically modulated optical waves;
a superposition module configured to generate a superposed electrical signal by superposing a plurality of electrical signals, each representing an enhancement layer of the respective one of the plurality of the hierarchically modulated optical waves; and
an enhancement-layer decoder configured to decode the superposed electrical signal to recover an additional data stream, a respective copy of which is encoded in an enhancement layer of each of the plurality of the hierarchically modulated optical waves.

2. The apparatus of claim 1, wherein:
a base layer of a first hierarchically modulated optical wave of the plurality of the hierarchically modulated optical waves is configured to carry a first data stream;
a base layer of a second hierarchically modulated optical wave of the plurality of the hierarchically modulated optical waves is configured to carry a second data stream different from the first data stream;
an enhancement layer of the first hierarchically modulated optical wave is configured to carry the additional data stream different from each of the first and second data streams; and
an enhancement layer of the second hierarchically modulated optical wave is configured to carry the additional data stream; and
the plurality of base-layer decoders comprises:
a first decoder configured to recover the first data stream by decoding a first electrical signal generated using the first hierarchically modulated optical wave; and
a second decoder configured to recover the second data stream by decoding a second electrical signal generated using the second hierarchically modulated optical wave; and
the plurality of electrical signals comprises (i) a first electrical signal representing the enhancement layer of the first hierarchically modulated optical wave and (ii) a second electrical signal representing the enhancement layer of the second hierarchically modulated optical wave.

3. The apparatus of claim 2, wherein:
a base layer of a third hierarchically modulated optical wave of the plurality of the hierarchically modulated optical waves is configured to carry a third data stream different from each of the first, second, and additional data streams;
an enhancement layer of the third hierarchically modulated optical wave is configured to carry the additional data stream;
the plurality of base-layer decoders comprises a third decoder configured to recover the third data stream by decoding a third electrical signal generated using the third hierarchically modulated optical wave; and
the plurality of electrical signals comprises a third electrical signal representing the enhancement layer of the third hierarchically modulated optical wave.

4. The apparatus of claim 1, wherein the superposition module is configured to generate the superposed electrical signal by summing the plurality of electrical signals in a manner that causes the superposed electrical signal to have a lower level of noise compared to a level of noise in any one of the plurality of the electrical signals taken individually.

5. The apparatus of claim 1, wherein the optical de-multiplexer is configured to perform one or more of space-division demultiplexing, wavelength-division demultiplexing, and polarization-division demultiplexing to generate the plurality of the hierarchically modulated optical waves.

6. The apparatus of claim 1, further comprising a plurality of enhancement-layer extractors, each coupled between a respective one of the plurality of the base-layer decoders and the superposition module and configured to generate a respective one of the plurality of the electrical signals by (i) estimating, in each symbol period, a base-layer component of the respective one of the plurality of the hierarchically modulated optical waves and (ii) subtracting, in each symbol period, the estimated base-layer component from an electrical signal generated by optically detecting the respective one of the plurality of the hierarchically modulated optical waves.

7. The apparatus of claim 1, wherein each of the plurality of the hierarchically modulated optical waves has a same symbol rate.

8. The apparatus of claim 1, wherein each of the base data streams has a first bit rate.

9. The apparatus of claim 8, wherein the additional data stream has a second bit rate different from the first bit rate.

10. The apparatus of claim 8, wherein the additional data stream has the first bit rate.

11. The apparatus of claim 1, further comprising an optical transmitter configured to cause the optical de-multiplexer to receive the optical input signal.

12. The apparatus of claim 11, wherein the optical transmitter comprises:
a plurality of encoders, each configured to generate a respective electrical drive signal based on a respective one of the plurality of the base data streams and a respective copy of the additional data stream;
a plurality of optical modulators, each configured to be driven by the respective electrical drive signal in a manner that causes each of the optical modulators to generate the respective one of the plurality of the hierarchically modulated optical waves, wherein the base layer of the respective one of the hierarchically modulated optical waves carries the respective one of the plurality of the base data streams, and the enhancement layer of each of the hierarchically modulated optical waves carries the additional data stream; and
an optical multiplexer configured to multiplex the plurality of the hierarchically modulated optical waves in a manner that causes the optical de-multiplexer to receive the optical input signal.

13. The apparatus of claim 12, wherein the optical multiplexer is configured to perform one or more of space-division multiplexing, wavelength-division multiplexing, and polarization-division multiplexing to multiplex the plurality of the hierarchically modulated optical waves.

14. The apparatus of claim 11, further comprising an optical link configured to optically couple the optical transmitter and the optical de-multiplexer.

15. The apparatus of claim 14, wherein the optical link comprises at least one reconfigurable optical add-drop multiplexer located between the optical transmitter and the optical de-multiplexer.

16. An apparatus comprising:
a plurality of encoders, each configured to generate a respective electrical drive signal based on a respective one of a plurality of base data streams and a respective copy of an additional data stream;

a plurality of optical modulators, each configured to be driven by the respective electrical drive signal in a manner that causes each of the optical modulators to generate a respective one of a plurality of hierarchically modulated optical waves, wherein a base layer of the respective one of the hierarchically modulated optical waves carries the respective one of the plurality of base data streams, and an enhancement layer of each of the hierarchically modulated optical waves carries the additional data stream; and an optical multiplexer configured to multiplex the plurality of the hierarchically modulated optical waves to generate an optical output signal.

17. The apparatus of claim 16, wherein the optical multiplexer is configured to perform one or more of space-division multiplexing, wavelength-division multiplexing, and polarization-division multiplexing to generate the optical output signal.

18. The apparatus of claim 16, wherein:

a base layer of a first hierarchically modulated optical wave of the plurality of the hierarchically modulated optical waves is configured to carry a first data stream;

a base layer of a second hierarchically modulated optical wave of the plurality of the hierarchically modulated optical waves is configured to carry a second data stream different from the first data stream;

an enhancement layer of the first hierarchically modulated optical wave is configured to carry the additional data stream different from each of the first and second data streams; and an enhancement layer of the second hierarchically modulated optical wave is configured to carry the additional data stream.

19. The apparatus of claim 18, wherein:

a base layer of a third hierarchically modulated optical wave of the plurality of the hierarchically modulated optical waves is configured to carry a third data stream different from each of the first, second, and additional data streams; and an enhancement layer of the third hierarchically modulated optical wave is configured to carry the additional data stream.

20. A communication method comprising:

de-multiplexing an optical input signal into a plurality of hierarchically modulated optical waves;

recovering a respective base data stream encoded in a base layer of a respective one of the plurality of the hierarchically modulated optical waves;

generating a superposed electrical signal by superposing a plurality of electrical signals, each representing an enhancement layer of the respective one of the plurality of the hierarchically modulated optical waves; and decoding the superposed electrical signal to recover an additional data stream, a respective copy of which is encoded in an enhancement layer of each of the plurality of the hierarchically modulated optical waves.

* * * * *